Patented Sept. 30, 1941

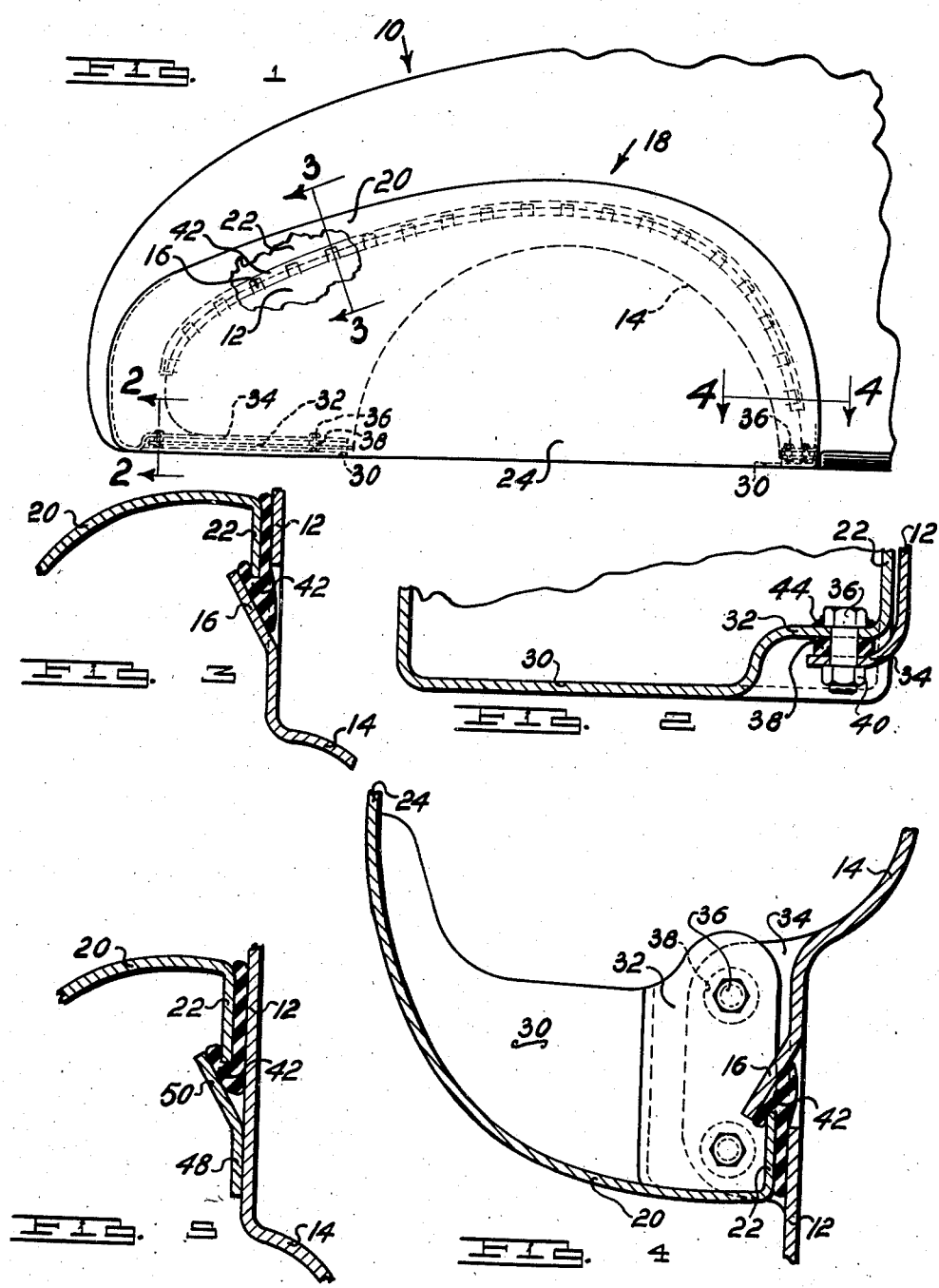

2,257,556

UNITED STATES PATENT OFFICE 2,257,556

FENDER

Austin A. Webb, Kenosha, Wis., assignor to Nash-Kelvinator Corporation, Kenosha, Wis., a corporation of Maryland Application December 12, 1940, Serial No. 369,730

3 Claims. (Cl. 280—153)

This invention relates to fenders and has particular reference to a fender for an automotive vehicle.

It is an object of this invention to provide a fender which is more easily attached to the automobile than fenders known heretofore.

It is another object of this invention to provide a fender which may be easily removed from the automobile in order to change a tire on the automobile.

It is another object of this invention to provide a fender of an automobile which will have better streamlining than fenders known heretofore.

It is another object of this invention to reduce the number of bolts required to attach the fender to the automobile.

Other objects and advantages of this invention will be apparent from a consideration of the following description and claims and the attached drawings, of which there is one sheet, and in which—

Figure 1 represents a side elevation of a rear fender and a portion of an automobile body;

Figure 2 represents a sectional view taken along a plane indicated by the line 2—2 in Figure 1 and looking in the direction of the arrows;

Figure 3 represents a sectional view taken along a plane indicated by the line 3—3 in Figure 1 and looking in the direction of the arrows;

Figure 4 represents a sectional view taken along a plane indicated by the line 4—4 in Figure 1 and looking in the direction of the arrows; and Figure 5 represents a sectional view similar to Figure 3 but illustrating a modified form of the invention.

Generally, the invention involves providing a fender with a vertical flange along its inside edge and a horizontal panel along the bottom of the fender at the front and rear thereof. The flange is arranged to fit into a wedge shaped groove formed by a projection on the body of the automobile and the horizontal panels are arranged to be drawn downwardly by means of bolts to draw the flange into the wedge shaped groove, thus causing the fender to be drawn tightly against the body of the automobile. The projection is positioned along a curved line or converging lines so as to have portions of its surface presented toward each end of the fender to prevent longitudinal movement of the fender. The invention is disclosed as being applied to the rear fender of an automobile but it will be realized that the same principle may be used to mount front fenders on the body.

Illustrated in the drawing is an automobile body 10 provided with a side panel 12 defining a wheel house 14. The wheel house 14 is curved inwardly of the body to clear a wheel (not shown) in the normal fashion. The side panel 12 is provided with a series of outwardly punched ears 16 which are positioned along a line which is generally parallel to and just below the contour of the upper edge of a fender generally indicated at 18. The fender 18 is provided with an upper crown portion 20 along the inside edge of which is formed a generally vertical flange 22 which is arranged to conform to the contour of the side panel 12. It will be noted that the lower edge of the flange 22 defines a downwardly opening curve. The outer side of the fender 18 from the crown 20 is formed into a skirt 24 which may extend completely across the wheel house instead of being cut away in the usual fashion. It is not necessary to provide the cut away portion since the fender may be completely removed to gain access to the wheel.

From the lower edge of the skirt 24 the fender is provided with generally horizontal panels 30 near the front and back of the fender. The horizontal panels 30 extend inwardly toward the body panel 12 and are attached to the vertical flange 22 of the fender. The horizontal panels are further provided with raised portions 32 just adjacent to the vertical flange 22.

The body panel 12 is provided with outwardly bent horizontal flanges 34 both to the front and to the rear of the wheel house 14. The flanges 34 are arranged to lie underneath the raised portions 32 of the fender and to be spaced slightly below the raised portions. Bolts 36 are passed downwardly through the raised portions 32 of the fender and through holes formed in the flanges 34. Deformable insulating members such as the rubber blocks 38 are positioned around the bolts 36 and nuts 40 are provided for drawing the horizontal portions of the fender downwardly toward the flanges 34. One or more of the bolts 36 may be provided at the front and rear of the fender.

It will be noted that the ears 16 bent outwardly from the side panel 12 form a wedge shaped groove, the outer surface of which is arranged to be engaged by the vertical flange 22 of the fender; thus by hooking the flange 22 of the fender over the series of ears 16 and drawing down the horizontal portion of the fender by means of the bolts 36, the flange 22 will be drawn downwardly on the wedge surface of the ears 16 causing the flange 22 to be clamped tightly against the body panel 12. A suitable molding such as the rubber strip 42 may be carried around the flange 22 between the flange and the side panel 12. The molding 42 prevents the connection from rattling and also prevents dust from entering the body through the holes formed by punching out the ears 16. The raised portions 32 formed on the horizontal panels 30 of the fender are provided so that the bolts 36 and nuts 40 will be concealed from view. If desired, the bolts 36 may be welded to the raised portion 32 as at 44 (see Figure 2) so that the nuts 40 may be tightened without reaching into the fender to hold the heads of the bolts. Other clamping means may be substituted for the bolts 36 and the wedge surface may be formed on the fender to engage a vertical flange on the body, or both the body flange and fender flange may have wedge surfaces without departing from the spirit of the invention. The hooked connection and the clamped connection between the fender and the body may also be reversed or have other positions with respect to the fender.

The fender may thus be easily mounted by merely hooking the flange 22 over the ears 16 and tightening one or two bolts in the front and back of the fender instead of tightening the whole series of bolts passed through the flange and body panel as has been the practice heretofore. It is thus feasible to remove the entire fender when it is desired to change a tire on the automobile, making it much simpler to jack up the vehicle and get at the wheel. The fender may be completely skirted, concealing the upper half of the wheel and enhancing the appearance of the automobile.

In the modified form of the invention illustrated in Figure 5, the ears 16 which were punched outwardly from the side panel 12 in the first form of the invention have been replaced by a continuous strip 48 which is welded to the side panel 12 and is provided with an outwardly bent upper edge 50 which performs the same function as the ears 16. The use of the strip 48 makes it unnecessary to punch holes in the side panel 12 through which dust might enter the body.

While I have described my invention in some detail, I intend this description to be an example only and not as a limitation of my invention, to which I make the following claims:

1. In combination with an automobile body, a fender having a crowned portion with a flange along the inner edge thereof, a skirt portion extending downwardly from said crowned portion, a horizontal panel turned over from the bottom edge of said fender at the front and back thereof, raised portions formed in said horizontal panels along the inside edges thereof, said raised portions connecting with the ends of said flange, flanges extending from said body and underlying said raised portions, and bolts extending between said last mentioned flanges and said raised portions, said flange having a hooked connection with said body.

2. In combination with an automobile body, a fender having a crown portion, a flange on the inner edge of said crown portion having a hooked connection with said body, a skirt extending downwardly from the outer edge of said crown portion, flat portions folded over from the lower edge of said skirt at the front and back of said fender, said flat portions connecting with the ends of said flange, and means for clamping said flat portions to said body.

3. In combination with an automobile body, a fender having a crown portion, a flange formed along the inner edge of said crown, said flange having a hooked connection with said body, a skirt depending from the outer edge of said crown, the lower edge of said skirt being folded over at one end of said fender, said folded portion joining with an end of said flange, a second flange extending outwardly from said body and underlying said folded portion, and means for drawing said folded portion downwardly toward said second flange.

AUSTIN A. WEBB.